(12) United States Patent
Enders et al.

(10) Patent No.: US 7,680,152 B2
(45) Date of Patent: Mar. 16, 2010

(54) METHOD FOR ESTABLISHING A USER OF A DATA NETWORK AS A PILOT MASTER

(75) Inventors: Thorsten Enders, Illingen (DE); Davide Buro, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 771 days.

(21) Appl. No.: 10/567,709

(22) PCT Filed: Jul. 3, 2004

(86) PCT No.: PCT/DE2004/001424
§ 371 (c)(1),
(2), (4) Date: Oct. 30, 2006

(87) PCT Pub. No.: WO2005/015832
PCT Pub. Date: Feb. 17, 2005

(65) Prior Publication Data
US 2007/0183460 A1    Aug. 9, 2007

(30) Foreign Application Priority Data
Aug. 7, 2003  (DE)  ................................. 103 36 946

(51) Int. Cl.
*H04J 3/06* (2006.01)
(52) U.S. Cl. ..................................... 370/503; 370/500
(58) Field of Classification Search ................. 370/503
See application file for complete search history.

(56) References Cited

U.S. PATENT DOCUMENTS
2003/0133473 A1 * 7/2003 Manis et al. ................ 370/480

FOREIGN PATENT DOCUMENTS
DE       101 42 408       4/2003

OTHER PUBLICATIONS

Leen, G. And D. Heffernan. "TTCAN: A New Time-Triggered Controller Area Network" Microprocessors and Microsystems. Elsevier Science. 2002.*
Jim Geier "802.11 Beacons Revealed" Oct. 31, 2002. http://www.wi-fiplanet.com/tutorials/article.php/149071.*
Leen et al., *TTCAN: A New Time-Triggered Controller Area Network*, Microprocessors and Microsystems, Mar. 17, 2002, IPC Business Press Ltd., London, GB, vol. 26, No. 2, pp. 77-94.

* cited by examiner

*Primary Examiner*—Huy D Vu
*Assistant Examiner*—Stephen J Clawson
(74) *Attorney, Agent, or Firm*—Kenyon & Kenyon LLP

(57) ABSTRACT

A method is described for establishing one user from multiple users of a data network as a pilot master for emitting a pilot signal, to which the other users of the data network may synchronize themselves. In the related art, a pilot signal is typically generated by a separate pilot signal generator or a permanently predefined selected user. However, this has the disadvantage that if the pilot signal generator or the selected user malfunctions, synchronization and therefore also communication of the users with one another via the data network is no longer possible. In order to avoid this disadvantage, it is suggested that at least two of the users of the data network be implemented to be pilot-master-capable and one of them assume the pilot mastership according to a described method.

11 Claims, 2 Drawing Sheets

METHOD FOR ESTABLISHING A USER OF A DATA NETWORK AS A PILOT MASTER

FIELD OF THE INVENTION

The present invention relates to a method for establishing one user, in particular a transceiver, from multiple users of a data network as a pilot master for emitting a pilot signal, to which the other users of the data network may synchronize themselves. In addition to this method, the present invention relates to a computer program for executing this method, a data carrier having this computer program, and a data network on which this method may be executed.

BACKGROUND INFORMATION

Bus systems, in which a previously established user of the bus system or a separate pilot signal generator is provided to generate a pilot signal to which the other users of the bus system may synchronize themselves, are known in the related art. This known method and this known bus system are subject to the disadvantage, however, that a malfunction of the user who emits the pilot signal, i.e., the pilot master, or the separate pilot signal generator results in a malfunction of the entire bus system.

SUMMARY OF THE INVENTION

On the basis of this related art, it is therefore the object of the present invention to refine a method for establishing a user as a pilot master, a corresponding computer program, as well as a data network for executing the method and a data carrier having this computer program, in such a way that the data network remains functional even if a current pilot master and/or a separate pilot signal generator malfunction(s).

This object is achieved in that at least two of the users are implemented to be pilot-master-capable; at least the pilot-master-capable users check, during an individually assigned checking time interval of random duration, whether an external pilot signal generated by other users is being transmitted on the data network; and the pilot-master-capable user which detects no external pilot signal on the data network during its checking time interval and randomly ends its assigned checking time interval earliest in comparison to the checking time intervals of the other pilot-master-capable users actually becomes the pilot master and emits the pilot signal after the random duration of its checking time interval has expired.

An external pilot signal as defined in the present invention is any pilot signal emitted by another user of the data network.

The claimed method offers the advantage that now not only one predefined user or separate pilot signal generator, but rather at least two, preferably all users of the data network are implemented in a pilot-master-capable manner and therefore may replace a malfunctioning pilot master. The users may advantageously determine a new pilot mastership among themselves with the aid of the method claimed; they are not dependent on external controllers or presets for this purpose. If the claimed method is implemented, advantageously, neither a separate pilot signal generator nor an original specification of a user as the pilot master is necessary, as was still the case in the related art. All pilot-master-capable users of the data network are advantageously not only capable in principle of assuming the pilot mastership, but rather also have equal standing in the assignment of the pilot mastership. The final actual assignment of the pilot mastership is decided in accordance with the randomness principle, or more precisely on the basis of the random duration of individually assigned checking time intervals of each user. The system security is significantly elevated by the claimed method, because multiple users are available as a potential pilot master. A malfunction of the pilot signal and thus also communication via the data network are therefore excluded as much as possible by the claimed method.

In order to ensure that multiple pilot-master-capable users do not wish to assume the pilot mastership simultaneously, a first exemplary embodiment of the present invention provides for one of the potential pilot master users to first only be awarded a temporary pilot mastership, during which the presence of an external pilot signal on the data network is checked further and more precisely. Only after the temporary pilot master has been successful in occupying the temporary pilot mastership a predefined number of times is it allowed to function permanently as the pilot master.

During the temporary pilot mastership, the temporary pilot master interrupts the emission of the pilot signal again and again, in order to check the presence of an external pilot signal on the network in the transmission pauses generated in this way. This checking is advantageously performed only after a delay time has expired after the emission of the pilot signal has ended, in order to prevent the current temporary pilot master from detecting its own pilot signal as the external pilot signal.

The transition of a user from a temporary pilot mastership to a permanent pilot mastership is advantageously displayed to the other users in the data network by emitting a recognition signal, preferably in the form of a ping signal. After recognizing this ping signal in particular, all other users enter an initially temporary slave state and synchronize themselves to the pilot signal emitted by the permanent pilot master.

If the temporary pilot master detects an external pilot signal in the data network during its temporary pilot mastership in the transmission pauses just cited, it enters a temporary slave state itself. Like every other user in the slave state, it then checks whether an external pilot signal is being transmitted on the data network, in particular, whether the ping signal is being emitted by another user. In principle, neither a temporary nor a permanent pilot master is determined in this situation and the method, also referred to as a master fight, starts from the beginning.

The above-mentioned object of the present invention is also achieved by a computer program for executing the method according to the present invention, a data carrier having this computer program, and a data network on which the method may be executed. The advantages of these achievements of the object correspond to the advantages cited above with reference to the claimed method. In addition, it is to be emphasized that the method may be applied not only on data networks which are implemented as a bus system, for example, as a CAN bus system, but also on data networks in the form of power supply lines, via which data is also transmitted (power communications).

DETAILED DESCRIPTION

The present invention will be described in greater detail in the following in the form of exemplary embodiments with reference to the two figures.

Figure 1:
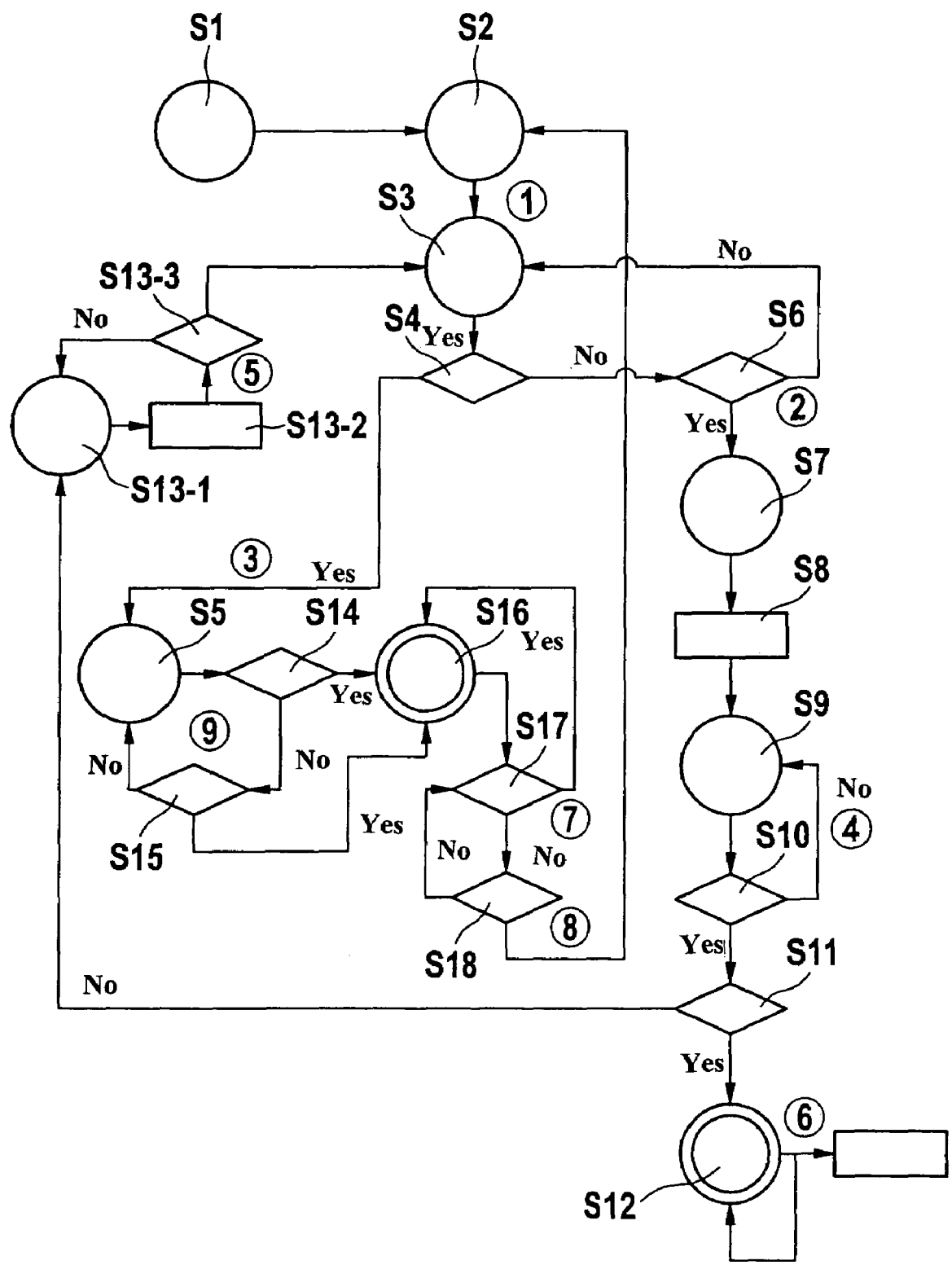
FIG. 1 shows a flowchart to illustrate the method according to the present invention.

FIG. 1 illustrates the method for establishing one user, in particular a transceiver, from multiple users of the data network as a pilot master for emitting a pilot signal, to which the other network users may then synchronize themselves. The method shown in FIG. 1 relates to a single user of the data network. It is executed identically in all users of the data network.

The starting point of the method is a reset state of the observed user. After this reset according to method step S1, each of the users enters an initialization step S2 and then, according to method step S3, a standby state.

Figure 2:
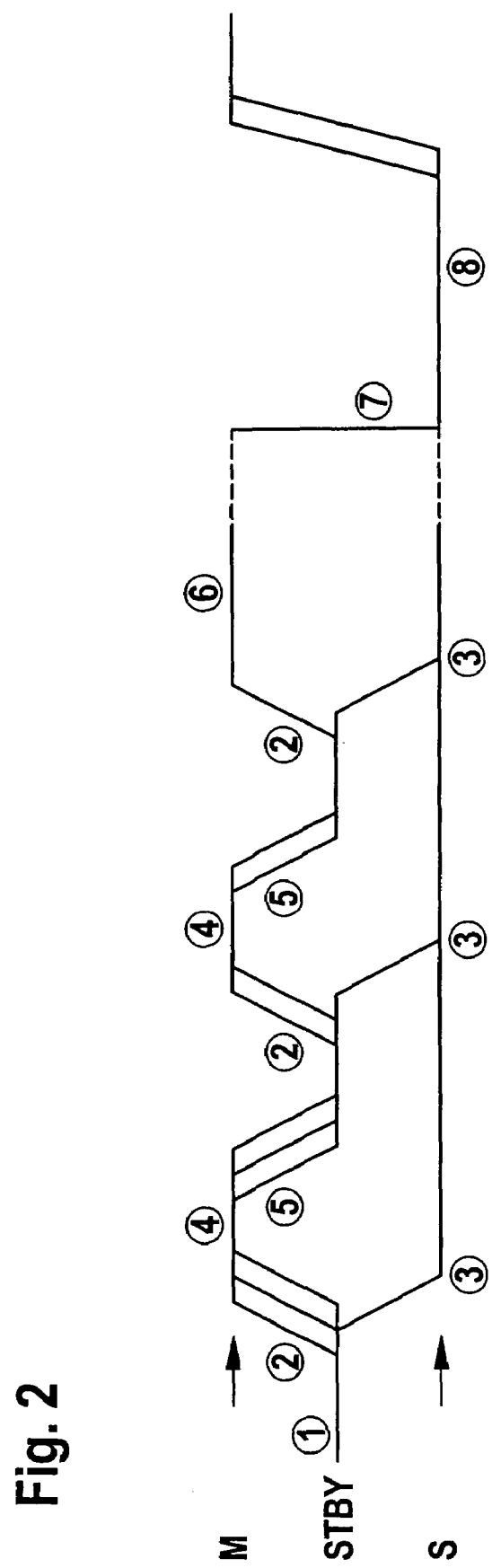
FIG. 2 shows a state diagram to illustrate the possible states which may be assumed by a user of the data network.

This standby state is also illustrated in FIG. 2 as the starting state for a user. FIG. 2 very generally illustrates the possible states which an individual user may assume during the execution of the method according to the present invention, i.e., as a master fight is executed. In addition to the standby state, these are a slave state or a pilot master state, in which the user emits a pilot signal into the data network, so that the other users of the data network may synchronize themselves to this pilot signal. The individual changes of a user between the cited possible states are indicated in FIG. 2 by reference numbers in the form of numbers in circles. The same reference numbers are found again in FIG. 1 and thus allow an assignment of the state change to the method sequence shown in FIG. 1.

After method step S3, the user checks in method step S4 whether an external pilot signal generated by another user is being transmitted on the data network. This checking is performed during a random duration of the checking time interval individually assigned to the user. If an external pilot signal is detected during the checking time interval, the user enters a temporary slave state according to method step S5. The expiration of the duration of the checking time interval is checked in method step S6. If no external pilot signal is detected on the data network by the expiration of the random duration of the checking time interval, the user enters a temporary master state, which is represented by method steps and/or states S7 through S11. State S7 is referred to as the master start. In this state, a counter, whose significance will be explained below, is incremented and a pilot signal is emitted into the data network according to method step S8. The emission is performed during a transmission time interval of random duration and is monitored in a master monitoring state, symbolized by S9. The end of the temporary transmission time interval is reached when it is determined in method step S10 that a timer representing the random duration of the transmission time interval has elapsed. The first temporary mastership of a user just described is also illustrated in FIG. 2. It may be seen there that the user enters the state of the temporary mastership, symbolized by a 4 in a circle, from the standby state after expiration of a first checking time interval of random duration, symbolized by a 2 in a circle.

Before a user permanently assumes a pilot mastership according to S12 in FIG. 1, it must assume the described temporary mastership a predefined number of times X. Therefore, it is checked in method step S11 on the basis of the current state of the counter incremented in state S7 whether the user was already temporary master X times. If this check yields a negative result, the user changes to a waiting state S13-1. It then turns off the temporarily emitted pilot signal from S13-2 at latest at this point and waits until a fixed predefined delay time S13-3 has expired.

Waiting time S13 between ending the temporary emission of the pilot signal and reentry into the checking time interval according to method step S4 is therefore necessary in order to prevent the user from detecting the self-emitted pilot signal during its temporary mastership during the renewed execution of method step S4.

After expiration of the delay time, the user briefly enters the standby state according to method step S3 again and then checks during the checking time interval of random duration according to method step S4 whether an external pilot signal is being transmitted in the data network.

Steps S4-S11 and S13 are then each executed again until predefined number of times X has been reached. Reaching number of times X is finally detected in method step SI I and the described cycle of temporary mastership and waiting state with subsequent checking phase is then interrupted and the user enters the permanent pilot mastership according to method step S12. During the permanent pilot mastership, the user permanently emits the pilot signal and indicates the assumption of the permanent pilot mastership by emitting a ping signal on the data network. The permanent pilot mastership is only ended by turning off the network or by a reset or malfunction of the permanent pilot master.

However, a user only assumes the permanent pilot mastership if it did not detect an external pilot signal on the data network during any of the repeated checking time intervals according to method step S4. If this is the case, the temporary pilot master up to this point changes to a temporary slave state, symbolized by S5. All other users also change to precisely the same temporary slave state after a user has declared itself as permanent pilot master S12. In state S5, the temporary slaves check, during a checking time interval having predefined duration, whether a ping signal is being transmitted in the data network. If either a ping signal is detected in method step S14 or it is determined in method step S15 that the predefined duration of the checking time interval has expired, the user changes to a permanent slave state S16. In this state 16, the user checks continuously whether an external pilot signal is being transmitted in the data network. As long as this is the case, the user remains in permanent slave state S16. However, if it is determined in method step S17 that an external pilot signal is no longer being transmitted, it continues the described checking procedure even during a further checking time interval. The duration of this further checking time interval is typically random, but it may also be permanently predefined. It is only important that this duration is significantly longer than the random durations which are checked in method steps S6 and S10. The duration checked in method step S18 is advantageously 10 times longer than the durations checked in method steps S6 and S10. If an external pilot signal is detected in the data network again at any time during the further checking time interval, the user again enters described permanent slave state S16. However, if no external pilot signal is detected in the data network even after expiration of this further checking time interval, the user again enters a check of the presence of an external pilot signal according to method step S4 via initialization state S2 and standby state S3. From there, the method steps repeat as described above.

The described method is preferably implemented in the form of a computer program. This computer program may be stored on a computer-readable data carrier, possibly together with further computer programs. The data carrier may be a diskette, a compact disc, a flash memory, or the like. In practice, the computer program is stored on an electrically erasable programmable read only memory EEPROM and is implemented on a field programmable gate array FPGA or a complex programmable logic device CPLD. The computer program stored on the data carrier may then be transferred and sold to a customer as a product.

However, the computer program does not absolutely have to be transferred to the customer on a data carrier. Rather, it may also be transferred and sold to a customer without the aid of a data carrier, possibly with further computer programs, via an electronic communication network, in particular the Internet.

The described method may be applied in principle to greatly varying data networks such as bus systems, in particular CAN bus systems. However, its application on a power supply network on which data is also transmitted (power line communications) is especially advantageous. The requirement for the application of the method in every case is that at least two, but preferably all, users are implemented in regard to their hardware in such a way that they are capable of assuming a pilot mastership.

The method according to the present invention has typically already been executed after a few milliseconds; this means that one of the users has been established as the pilot master at latest after this time and then synchronization of the users of the data network among one another and communication between the users is possible.

What is clamed is:

1. A method for establishing one user corresponding to a transceiver, from multiple users of a data network, as a pilot master for emitting a pilot signal to which other users of the data network can synchronize themselves, comprising:
   providing at least two of the users as pilot-master-capable; and
   checking by at least the pilot-master-capable users, during a checking time interval of random duration individually assigned to them, whether an external pilot signal generated by another user is being transmitted on the data network;
   wherein at least one of the pilot-master-capable users, which detects an external pilot signal on the data network during its checking time interval, enters a temporary slave state,
   wherein one of the pilot-master-capable users, which detects no external pilot signal on the data network during its checking time interval and randomly ends its assigned checking time interval earliest in comparison to the checking time intervals of the other pilot-master-capable users, actually becomes a pilot master and emits the pilot signal after the random duration of its checking time interval has elapsed, and
   wherein:
   a) the pilot master assigns the pilot mastership to itself only temporarily for a transmission time interval of random duration and it ends the emission of the pilot signal again after expiration of this transmission time interval;
   b) the last temporary pilot master, after expiration of the transmission time interval, checks again, during a further checking time interval of random duration assigned to it, whether a pilot signal generated by another user is being transmitted on the data network;
   c) the last temporary pilot master becomes pilot master again and emits the pilot signal if it detects no external check signal on the data network during the further checking time interval and no other pilot-master-capable user claims the pilot mastership for itself earlier; and
   d) the steps a) through c) are repeated for a predefined number of times X−1.

2. The method as recited in claim 1, wherein the step b) is executed only after expiration of a delay time after the end of the step a).

3. The method as recited in claim 2, wherein the last pilot master remains the permanent pilot master and permanently emits the pilot signal after the X-1 th repetition.

4. The method as recited in claim 3, wherein the permanently implemented pilot master emits a recognition signal in the form of a ping signal.

5. The method as recited in claim 4, wherein the permanent pilot mastership is only ended by turning off the data network or a reset or malfunction of the permanent pilot master.

6. The method as recited in claim 5, wherein, after permanent implementation of the pilot master and after reception of the ping signal, all other users of the data network enter a temporary slave state and synchronize themselves to the pilot signal emitted by the pilot master.

7. The method as recited in claim 1, wherein a user in the temporary slave state checks, during the predefined duration of a checking time interval, whether an external pilot signal is being transmitted on the data network and whether a ping signal is being emitted by the permanently implemented pilot master.

8. The method as recited in claim 7, wherein:
   if either the ping signal is recognized or the predefined duration of the checking time interval has expired, the user in the temporary slave state changes to a permanent slave state, in which the user communicates to a controller of the data network that it is ready to participate in communication via the data network, and
   if possible, the user in the permanent slave state synchronizes itself to the pilot signal emitted by the pilot master.

9. The method as recited in claim 8, wherein:
   a user remains in the permanent slave state as long as it detects an external pilot signal in the data network,
   as soon as a pilot signal is no longer detected, the user checks again, during a checking time interval having predefined or random duration (S18), whether an external pilot signal is being transmitted,
   if an external pilot signal is determined during the checking time interval, the user remains in the permanent slave state; and
   if no external pilot signal is determined during the checking time interval, the user changes to the step of checking for the external pilot signal via the initialization state and the standby state after expiration of the duration of the checking time interval, in order to execute the method again from there.

10. A data network having multiple users, on which a pilot signal is emitted by a user functioning as the pilot master, so that the other users of the data network may synchronize themselves to this pilot signal, wherein each of the users is pilot-master-capable and is designed to execute, in order to be able to make itself pilot master if necessary, a method for establishing one user corresponding to a transceiver, from multiple users of a data network, as a pilot master for emitting a pilot signal to which other users of the data network can synchronize themselves, comprising:
   providing at least two of the users as pilot-master-capable; and
   checking by at least the pilot-master-capable users, during a checking time interval of random duration individually assigned to them, whether an external pilot signal generated by another user is being transmitted on the data network;
   wherein at least one of the pilot-master-capable users which detects an external pilot signal on the data network during its checking time interval, enters a temporary slave state, and wherein one of the pilot-master-capable users, which detects no external pilot signal on the data network during its checking time interval and randomly ends its assigned checking time interval earliest in comparison to the checking time intervals of the other pilot-master-capable users, actually becomes pilot master and emits the pilot signal after the random duration of its checking time interval has elapsed, and wherein (i) the pilot master assigns the pilot mastership to itself only temporarily for a transmission time interval of random duration and it ends the emission of the pilot signal again after expiration of this transmission time interval, (ii) the last temporary pilot master, after expiration of the transmission time interval, checks again, during a further checking time interval of random duration assigned to it, whether a pilot signal generated by another user is being transmitted on the data network, and (iii) the last temporary pilot master becomes pilot master again and emits the pilot signal if it detects no external check signal on the data network during the further checking time interval and no other pilot-master-capable user claims the pilot mastership for itself earlier, and wherein (i), (ii) and (iii) are repeated for a predefined number of times X-1.

11. The data network as recited in claim 10, wherein the data network includes power supply lines in a motor vehicle and via which data is also transmitted to produce power line communications.

* * * * *